US009816058B2

(12) United States Patent
Rives

(10) Patent No.: US 9,816,058 B2
(45) Date of Patent: Nov. 14, 2017

(54) THREE-DIMENSIONAL SOAP OBJECTS FORMED BY ADDITIVE MANUFACTURING

(71) Applicant: 3D Systems, Incorporated, Rock Hill, SC (US)

(72) Inventor: Roxanne Rives, Burbank, CA (US)

(73) Assignee: 3D Systems, Inc., Rock Hill, SC (US)

( * ) Notice: Subject to any disclaimer, the term of this patent is extended or adjusted under 35 U.S.C. 154(b) by 328 days.

(21) Appl. No.: 14/681,317

(22) Filed: Apr. 8, 2015

(65) Prior Publication Data

US 2015/0291921 A1  Oct. 15, 2015

Related U.S. Application Data

(60) Provisional application No. 61/978,033, filed on Apr. 10, 2014.

(51) Int. Cl.
*C11D 13/14* (2006.01)
*B33Y 30/00* (2015.01)
*B33Y 80/00* (2015.01)
*B29C 64/165* (2017.01)
*B22F 1/00* (2006.01)
*B22F 3/00* (2006.01)
*B29K 33/00* (2006.01)
*B29C 64/20* (2017.01)

(52) U.S. Cl.
CPC .............. *C11D 13/14* (2013.01); *B22F 1/007* (2013.01); *B22F 3/008* (2013.01); *B29C 64/165* (2017.08); *B33Y 30/00* (2014.12); *B33Y 80/00* (2014.12); *B29C 64/20* (2017.08); *B29K 2033/00* (2013.01)

(58) Field of Classification Search
CPC . C11D 13/14; B29C 67/0081; B29C 67/0085; B33Y 80/00; B33Y 30/00; B29K 2033/00; B29L 2031/722
USPC ........................ 425/130, 174, 174.4; 264/128
See application file for complete search history.

(56) References Cited

U.S. PATENT DOCUMENTS

| | | | | |
|---|---|---|---|---|
| 5,387,380 A * | 2/1995 | Cima | ...................... | B05C 19/04 264/109 |
| 6,508,980 B1 * | 1/2003 | Sachs | .................... | B22F 1/0059 419/26 |
| 7,435,368 B2 * | 10/2008 | Davidson | ................ | B29C 41/12 264/113 |
| 2004/0106691 A1 * | 6/2004 | Monsheimer | .......... | C08K 5/098 522/2 |

(Continued)

Primary Examiner — Matthew Daniels
Assistant Examiner — Leith S Shafi

(57) ABSTRACT

In one aspect, 3D printing systems for fabricating 3D soap objects are described herein. Such systems can form 3D soap objects from a particulate material and a fluid binder material based on design data, such as digital design data. In some cases, a 3D printing system comprises a build chamber comprising a build bed, a particulate material distribution device, and a fluid binder material dispenser. The particulate material distribution device can be configured to distribute successive layers of the particulate material on the build bed. The fluid binder material dispenser can be configured to selectively apply the fluid binder material to portions of the successive layers of particulate material in an amount sufficient to consolidate the portions to define cross-sectional portions of the object. In addition, the particulate material comprises a soap component in an amount of about 10 to 100% by weight.

20 Claims, 3 Drawing Sheets

(56) References Cited

U.S. PATENT DOCUMENTS

2008/0300353 A1* 12/2008 Monsheimer .......... C08K 5/098
          524/394
2013/0034633 A1*  2/2013 von Hasseln ....... B29C 67/0081
          426/104

* cited by examiner

THREE-DIMENSIONAL SOAP OBJECTS FORMED BY ADDITIVE MANUFACTURING

CROSS REFERENCE TO RELATED APPLICATIONS

This application claims priority pursuant to 35 U.S.C. §119 to U.S. Provisional Patent Application Ser. No. 61/978,033, filed on Apr. 10, 2014, which is hereby incorporated by reference in its entirety.

FIELD

The present disclosure relates to three-dimensional (3D) soap objects and to systems, kits, and methods for forming soap objects by additive manufacturing.

BACKGROUND

Soaps and soap products can be made in a variety of sizes and shapes, including decorative shapes or other specially-designed shapes. Some such decorative or specially-designed soap products are formed by stamping monolithic soap materials or by carrying out saponification or other soap-making processes in specially-designed molds. However, such stamping or molding processes can require expensive tooling operations and/or require the production of large numbers of identical soap products. In addition, such processes can be time consuming and can provide soap products having limited geometries and/or limited feature resolution. Moreover, soap products made by stamping or molding processes can be compositionally homogeneous or monolithic or substantially homogeneous or monolithic. Therefore, improved soap products and methods of making soap products are desired.

SUMMARY

Three-dimensional soap objects and three-dimensional printing systems, kits, and methods of making soap objects are described herein. Such objects, systems, kits, and methods, in some cases, can provide one or more advantages compared to other objects, systems, kits, and methods. In some embodiments, for instance, systems, kits, and methods described herein can provide custom soap objects having a wide variety of shapes with high feature resolution. Soap objects described herein can also have a varying composition, such that the color, fragrance, or other property of a specific soap object can vary within different spatial regions of the soap object.

In one aspect, 3D printing systems for fabricating 3D soap objects are described herein. Such systems can form 3D soap objects from a particulate material and a fluid binder material based on design data, such as digital design data. In some cases, a 3D printing system described herein comprises a build chamber comprising a build bed, a particulate material distribution device, and a fluid binder material dispenser. The particulate material distribution device can be configured to distribute successive layers of the particulate material on the build bed. The fluid binder material dispenser can be configured to selectively apply the fluid binder material to portions of the successive layers of particulate material in an amount sufficient to consolidate the portions to define cross-sectional portions of the object. In addition, the particulate material comprises a soap component in an amount of about 10 to 100% by weight, based on the total weight of the particulate material. Moreover, in some cases, the build chamber of a system described herein further comprises one or more colorant dispensers and/or one or more fragrance dispensers.

Further, in some embodiments, a system described herein also comprises a post-processing chamber. The post-processing chamber can comprise a particulate material removal device, such as a vacuum, fan, or source of pressurized gas. In addition, a system described herein, in some cases, further comprises a controller. Such a controller can include a computer and/or software configured to direct one or more steps of a 3D printing process carried out with the system.

In another aspect, kits for 3D printing are described herein. In some embodiments, a kit described herein comprises a particulate material comprising a soap component; and a binder material operable to consolidate particles of the soap component when applied to the particles in a fluid state. In some embodiments, the soap component is present in an amount of about 10 to 100% by weight, based on the total weight of the particulate material. The soap component can comprise one or more surfactants, one or more fatty acids or fatty acid salts, and/or one or more organosulfates. Moreover, in some instances, the particulate material of a kit described herein further comprises one or more additives, such as one or more foaming agents, colorants or pigments, fragrances, preservatives, abrasion agents, antimicrobial agents, and/or antifungal agents.

The binder material of a kit described herein, in some embodiments, comprises an adhesive material and/or a soap component in an amount of about 10 to 100% by weight, based on the total weight of the binder material. When present, the soap component of a binder material can have the same or a different chemical composition than the soap component of the particulate material of the kit. In addition, a binder material described herein, in some embodiments, can comprise one or more additives, including one or more colorants, fragrances, preservatives, antimicrobial agents, and/or antifungal agents.

In another aspect, methods of printing a 3D object are described herein. In some embodiments, a method described herein comprises providing a layer of particulate material including a plurality of adjacent particles, the particulate material comprising a soap component in an amount of about 10 to 100% by weight, based on the total weight of the particulate material; and applying a fluid binder material to at least some of the plurality of particles in an amount sufficient to consolidate the particles together to define a cross-sectional portion of the object. In some cases, the method further comprises providing one or more additional layers of particulate material comprising a soap component and applying a fluid binder material to at least a portion of each additional layer in an amount sufficient to consolidate particles of the one or more additional layers together to define one or more additional cross-sectional portions of the object, wherein the method is carried out in a layer-by-layer manner to provide a printed object. Further, in some embodiments of a method described herein, the particulate material is maintained at a temperature of about 35° C. or below during printing. In addition, a method described herein, in some instances, further comprises removing excess particulate material from a surface of the printed object.

In still another aspect, printed 3D objects are described herein. In some embodiments, a printed 3D object comprises a particulate material phase including a plurality of particles; and a binder material phase dispersed throughout the particulate material phase and differing from the particulate material phase, wherein the particulate material phase comprises a soap component in an amount of about 10 to 100% by weight. The binder material phase of an object described herein, in some cases, comprises an adhesive material and/or a soap component in an amount of about 10 to 100% by weight. Additionally, the binder material phase of an object described herein can form a continuous network within the object.

These and other embodiments are described in greater detail in the detailed description which follows.

DETAILED DESCRIPTION

Figure 1:
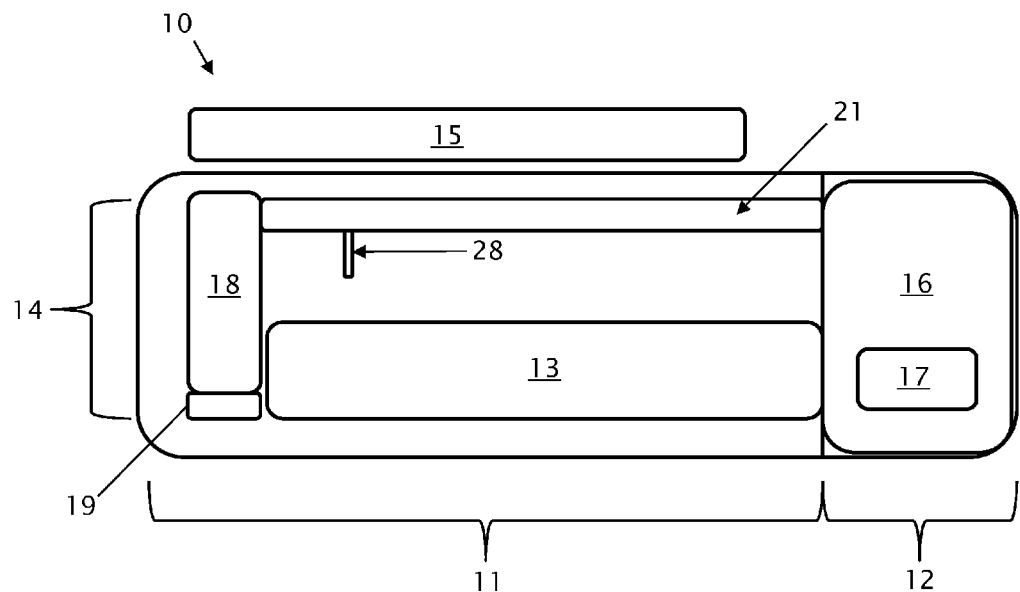
FIG. 1 illustrates a sectional view of the front of a 3D printing system according to one embodiment described herein.

Embodiments described herein can be understood more readily by reference to the following detailed description, examples, and drawings. Elements, apparatus and methods described herein, however, are not limited to the specific embodiments presented in the detailed description, examples, and drawings. It should be recognized that these embodiments are merely illustrative of the principles of the present disclosure. Numerous modifications and adaptations will be readily apparent to those of skill in the art without departing from the spirit and scope of the disclosure.

In addition, all ranges disclosed herein are to be understood to encompass any and all subranges subsumed therein. For example, a stated range of "1.0 to 10.0" should be considered to include any and all subranges beginning with a minimum value of 1.0 or more and ending with a maximum value of 10.0 or less, e.g., 1.0 to 5.3, or 4.7 to 10.0, or 3.6 to 7.9.

All ranges disclosed herein are also to be considered to include the end points of the range, unless expressly stated otherwise. For example, a range of "between 5 and 10" should generally be considered to include the end points 5 and 10.

Further, when the phrase "up to" is used in connection with an amount or quantity, it is to be understood that the amount is at least a detectable amount or quantity. For example, a material present in an amount "up to" a specified amount can be present from a detectable amount and up to and including the specified amount.

I. 3D Printing Systems for Fabricating Soap Objects

In one aspect, 3D printing systems for fabricating soap objects are described herein. Such systems fabricate the soap objects from a particulate material and a fluid binder material based on design data. For reference purposes herein, the terms "3D printing" and "additive manufacturing" are to be understood as synonymous terms. In some embodiments, a 3D printing or additive manufacturing system described herein comprises a build chamber comprising a build bed, a particulate material distribution device, and a fluid binder material dispenser. The particulate material distribution device is configured to distribute successive layers of the particulate material on the build bed, and the fluid binder material dispenser is configured to selectively apply the fluid binder material to portions of the successive layers of particulate material in an amount sufficient to consolidate the portions to define cross-sectional portions of the object. Further, the particulate material comprises a soap component in an amount of about 10 to 100% by weight, based on the total weight of the particulate material. Therefore, a system described herein can be used to print, form, or make a 3D soap object.

In particular, a system described herein can be used to print a 3D soap object in a layer-by-layer manner directly from computer-generated structural data, such as computer-aided design (CAD) data. Such a system can be used to form successive thin cross-sections or layers of the desired object as follows. Individual cross-sections or layers are formed by bonding together or consolidating adjacent particles or grains of the particulate or granular material (or powder) on a generally planar surface of a bed of the particulate material. This bed can be supported by or formed on a generally planar surface of the build bed of a system described herein. Each layer of particulate material is bonded to or consolidated with a previously formed layer at the same time as the particles of each layer are bonded together or consolidated to form the desired 3D object. Specifically, an inkjet style print head or other print head can be used to deliver a fluid binder material to the sequentially applied layers of particulate material. The fluid binder material can be a colloidal or non-colloidal liquid. More particularly, such a 3D printing process involves applying a layer of a particulate material to a surface using a counter-roller or other particulate material distribution device. After the particulate material is applied to the surface, the inkjet print head or other print head delivers the fluid binder material in a predetermined pattern to the layer of particulate material. The binder material infiltrates into gaps in the particulate material and hardens or otherwise serves to consolidate the particulate material into a solidified layer. The hardened or otherwise consolidated binder material also bonds or consolidates each layer of particulate material to the previous layer. After such a cross-section or layer is formed, the previous steps are repeated, building successive cross-sections or layers until the final object is formed. The cross-sections or layers of the object can have various thicknesses, and, if desired, different cross-sections or layers can have the same or different thicknesses.

Systems described herein, in some embodiments, can also be used to form printed soap objects having a varying composition, such that the color, fragrance, or other property of a specific soap product can vary within different spatial regions of the soap product. For example, in some instances, the build chamber of a system described herein further comprises one or more colorant dispensers. Additionally, in some cases, the build chamber of a system described herein also comprises one or more fragrance dispensers. Moreover, as described further hereinbelow, the colorant dispensers and/or the fragrance dispensers of a build chamber described herein, in some embodiments, can provide color and/or fragrance to a cross-section of a soap object in a precise manner, including in a voxel-by-voxel manner. A 3D printing system described herein can also omit such colorant and/or fragrance dispensers. In such cases, if desired, one or more colorants and/or one or more fragrances can be included in a particulate material and/or fluid binder material described herein. Thus, a soap product formed by a system described herein can have a composition of varying fragrance and/or color, including a composition that has different fragrances and/or colorants in different voxels of the composition.

A 3D printing system described herein, in some embodiments, can also comprise a post-processing chamber comprising a particulate material removal device. Such a particulate material removal device, in some cases, can be used to remove excess or loose particulate material from the surface of a printed soap object formed using the system. For example, in some instances, a particulate material removal device comprises a vacuum, a fan, or a source of pressurized gas that can be applied to the printed soap object to remove excess or loose particulate material from the surface of the object.

In addition, in some embodiments, a system described herein further comprises a controller. The controller can be a computer or other apparatus including hardware, alone or under direction of one or more computer program code instructions, program instructions or executable computer-readable program code instructions from a computer-readable storage medium. The controller of a system described herein may be connected to or otherwise in communication with one or more other components of the system, such as one or more dispensers, in a number of different manners, such as directly or indirectly via a wireline or wireless network. Further, the controller can be configured to direct, coordinate, or control the operation of various other components of the system, including in response to user input and/or to provide an object corresponding to design data accessed by the controller.

Turning now to specific components of 3D printing systems, systems described herein comprise a build chamber comprising a build bed. The build bed can have any structure not inconsistent with the objectives of the present disclosure. In some embodiments, for instance, the build bed comprises a container having a planar or substantially planar surface or plate, an adjustable height component attached to the plate, and a drive mechanism attached to the adjustable height component. The adjustable height component can comprise any component operable to provide an adjustable height or linear movement in the z-direction to the substantially planar surface or plate of the build bed. For example, an adjustable height component can be a piston or cylinder, including a compressible piston or cylinder. An adjustable height component can also have an accordion or jack-like structure. A build bed such as the foregoing is described in further detail below. Additionally, a build bed having the foregoing construction can be used to support or retain a particulate material used for forming a soap product in a manner described herein. Build beds having other constructions may also be used. For example, in some embodiments, a build bed has a construction described in U.S. Pat. No. 5,204,055 to Sachs et al.; U.S. Pat. No. 5,340,656 to Sachs et al.; U.S. Pat. No. 5,387,380 to Cima et al.; U.S. Pat. No. 5,902,441 to Bredt et al.; U.S. Pat. No. 6,146,546 to Sachs et al.; or U.S. Pat. App. Pub. No. 2013/0034633 to von Hasseln, the entireties of which are hereby incorporated by reference. The particulate material supported or retained by the build bed of a system described herein can serve as the printing substrate that receives fluid binder material, colorants, and/or fragrances during printing.

The build chamber of systems described herein also comprises a particulate material distribution device configured to distribute successive or sequentially stacked layers of the particulate material on the build bed. Any particulate material distribution device not inconsistent with the objectives of the present disclosure may be used. In some cases, the particulate material distribution device comprises a planarizer, spreader, or counter-roller, a drive mechanism, and one or more connectors attaching the planarizer, spreader, or counter-roller to the drive mechanism. A particulate material distribution device having the foregoing construction can be used to provide a planar or substantially planar layer of particulate material on a build bed or on an underlying layer of particulate material for subsequent consolidation by a fluid binder material in a manner described herein. Particulate material distribution devices having other constructions than the foregoing may also be used. For example, in some embodiments, a particulate material distribution device has a construction described in U.S. Pat. No. 5,204,055 to Sachs et al.; U.S. Pat. No. 5,340,656 to Sachs et al.; U.S. Pat. No. 5,387,380 to Cima et al.; U.S. Pat. No. 5,902,441 to Bredt et al.; U.S. Pat. No. 6,146,546 to Sachs et al.; or U.S. Pat. App. Pub. No. 2013/0034633 to von Hasseln.

As described herein, the particulate material of a 3D printing system can comprise a soap component in an amount of about 10 to 100% by weight, based on the total weight of the particulate material. In some embodiments, the particulate material comprises a soap component in an amount of about 30 to 100% by weight, about 50 to 100% by weight, about 60 to 100% by weight, about 80 to 100% by weight, about 30 to 90% by weight, about 60 to 90% by weight, about 30 to 80% by weight, or about 40 to 70% by weight, based on the total weight of the particulate material.

Moreover, the particulate material of a 3D printing system described herein can comprise any soap component not inconsistent with the objectives of the present disclosure. In some embodiments, for instance, the soap component of a particulate material described herein comprises or is formed from one or more surfactants. In some cases, the soap component comprises or is formed from one or more fatty acids and/or fatty acid salts. Moreover, a fatty acid salt can be a sodium salt of a fatty acid or a potassium salt of a fatty acid. Further, in some embodiments, the soap component comprises or is formed from one or more organosulfates. Non-limiting examples of soap components suitable for use in some embodiments of a particulate material of a system described herein include sodium lauryl sulfate, sodium tallowate, sodium cocoate, sodium palm kernelate, sodium laurate, sodium myristate, sodium palmitate, sodium stearate, sodium oleate, sodium linoleate, sodium linolenate, and combinations of two or more of the foregoing. Further, in some cases, the sodium counter ions of one or more of the foregoing species can be replaced with potassium counter ions to provide potassium-containing species. The soap component can also comprise a fatty acid such as one or more of lauric acid, myristic acid, palmitic acid, stearic acid, oleic acid, linoleic acid, and linolenic acid. Further, in some instances, the soap component can comprise a mixture of surfactants, fatty acids, fatty acid salts, and/or organosulfates described herein.

In addition, the particulate material of a system described herein can further comprise one or more additives selected from foaming agents, colorants or pigments, fragrances, preservatives, abrasion agents, antimicrobial agents, and antifungal agents. Any foaming agents, colorants or pigments, fragrances, preservatives, abrasion agents, antimicrobial agents, and/or antifungal agents not inconsistent with the objectives of the present disclosure may be used. In some embodiments, for example, the particulate material further comprises one or more of sodium carbonate, sodium bicarbonate, sodium chloride, citric acid, ethylenediaminetetraacetic acid or a salt thereof, sodium metasilicate, kaolin, clay, sand, pumice, and titanium dioxide. In other cases, the particulate material further comprises metal particles, such as particles containing or formed from nickel, aluminum, and/or silver.

An additive described above can be present in a particulate material described herein in any amount not inconsistent with the objectives of the present disclosure. In some embodiments, for example, the particulate material comprises an additive in an amount of up to about 90% by weight, up to about 50% by weight, up to about 30% by weight, up to about 10% by weight, up to about 5% by weight, or up to about 1% by weight, based on the total weight of the particulate material. In some cases, the particulate material comprises an additive in an amount of about 1 to 90% by weight, about 1 to 70% by weight, about 1 to 50% by weight, about 1 to 30% by weight, about 1 to 15% by weight, about 1 to 10% by weight, about 5 to 15% by weight, about 5 to 10% by weight, about 10 to 70% by weight, or about 10 to 30% by weight, based on the total weight of the particulate material.

The build chamber of 3D printing systems described herein also comprises one or more fluid binder material dispensers configured to selectively apply the fluid binder material to portions of successive or sequential layers of particulate material in an amount sufficient to consolidate the portions to define cross-sectional portions of the printed soap object. A fluid binder material dispenser can have any structure not inconsistent with the objectives of the present disclosure. In some embodiments, for example, a fluid binder material dispenser comprises a drive mechanism, such as a translatable carriage mechanism, attached to a print head, such as a drop-on-demand (DOD) or piezoelectric print head. Additionally, in some cases, a fluid binder material dispenser is heated with a heating device, including to a temperature above the melting point of the fluid binder material to be used with the dispenser. One non-limiting print head suitable for use in some embodiments described herein is the piezoelectric Z850 print head available from Xerox Corporation. Other piezoelectric print heads are described in U.S. Pat. No. 6,347,257 to Bedal et al., the entirety of which is hereby incorporated by reference. Additional suitable print heads are commercially available from a variety of ink jet printing apparatus manufacturers. For example, the Taipan print head available from Xerox or Ricoh print heads may also be used in some embodiments described herein. Further print heads, and other components of binder material dispensers, are described in U.S. Pat. No. 5,204,055 to Sachs et al.; U.S. Pat. No. 5,340,656 to Sachs et al.; U.S. Pat. No. 5,387,380 to Cima et al.; U.S. Pat. No. 5,902,441 to Bredt et al.; and U.S. Pat. No. 6,146,546 to Sachs et al.

As described further hereinbelow, a fluid binder material dispenser described herein can permit the application of a fluid binder material to a layer of particulate material in a precise manner in the xy-plane, where the xy-plane defines the surface of the layer of particulate material. In some cases, a fluid binder material dispenser is configured to provide a fluid binder material to any location within the xy-plane defining the surface of a layer of particulate material.

Any fluid binder material not inconsistent with the objectives of the present disclosure may be used with a fluid binder material dispenser described herein. In some embodiments, the fluid binder material comprises an adhesive material in an amount of about 10 to 100% by weight, based on the total weight of the fluid binder material. In some cases, the fluid binder material comprises an adhesive in an amount of about 30 to 100% by weight, about 50 to 100% by weight, about 60 to 100% by weight, about 80 to 100% by weight, about 30 to 90% by weight, about 60 to 90% by weight, about 30 to 80% by weight, or about 40 to 70% by weight, based on the total weight of the binder material. Any adhesive material not inconsistent with the objectives of the present disclosure may be used. In some embodiments, for instance, an adhesive material comprises or is formed from a non-toxic and/or water-soluble adhesive material such as a poly(vinyl alcohol) or a starch.

In other cases, the binder material of a system described herein comprises a soap component in an amount of about 10 to 100% by weight, based on the total weight of the binder material. In some embodiments, the binder material comprises a soap component in an amount of about 30 to 100% by weight, about 50 to 100% by weight, about 60 to 100% by weight, about 80 to 100% by weight, about 30 to 90% by weight, about 60 to 90% by weight, about 30 to 80% by weight, or about 40 to 70% by weight, based on the total weight of the binder material. The soap component of a binder material can comprise any soap component described hereinabove for a particulate material. For example, in some instances, a soap component of a binder material comprises one or more fatty acids or fatty acid salts, including sodium salts and potassium salts of fatty acids. In other cases, a soap component of a binder material comprises or is formed from a vegetable oil such as palm oil, coconut oil, olive oil, and/or laurel oil. In some embodiments, a binder material comprises one or more of cocoa butter, shea butter, coconut acid, palm kernel acid, and glycerin. Other materials may also be used. Moreover, when a fluid binder material described herein comprises or is formed from a soap component, including a melted soap component, the soap component of the fluid binder material can be chemically the same or chemically different than the soap component of the particulate material to which the fluid binder material is applied.

Further, in some embodiments, a fluid binder material described herein comprises a mixture or blend of aqueous sodium hydroxide (NaOH) or aqueous potassium hydroxide (KOH) with an oil such as a vegetable oil described herein or another oil. In such instances, the amounts of oil and hydroxide can be selected based on one or more of a desired viscosity, a desired solids content, and a desired pH of the fluid binder material.

Additionally, in some cases, a binder material described herein further comprises one or more additives selected from colorants or pigments, fragrances, preservatives, antimicrobial agents, and/or antifungal agents. Any colorants or pigments, fragrances, preservatives, antimicrobial agents, and/or antifungal agents not inconsistent with the objectives of the present disclosure may be used. In some embodiments, a colorant, fragrance, preservative, antimicrobial agent, and/or antifungal agent comprises a colorant, fragrance, preservative, antimicrobial agent, and/or antifungal agent described hereinabove for the particulate material of a 3D printing system described herein. Further, an additive described above can be present in a fluid binder material in any amount not inconsistent with the objectives of the present disclosure. In some embodiments, for example, the fluid binder material comprises an additive in an amount of up to about 90% by weight, up to about 50% by weight, up to about 30% by weight, up to about 10% by weight, up to about 5% by weight, or up to about 1% by weight, based on the total weight of the fluid binder material. In some cases, the fluid binder material comprises an additive in an amount of about 0.01 to 90% by weight, about 0.1 to 70% by weight, about 1 to 50% by weight, about 1 to 30% by weight, about 1 to 15% by weight, about 1 to 10% by weight, about 5 to 15% by weight, about 5 to 10% by weight, about 10 to 70% by weight, or about 10 to 30% by weight, based on the total weight of the fluid binder material.

The build chamber of 3D printing systems described herein, in some embodiments, further comprises one or more colorant dispensers and/or one or more fragrance dispensers. Such dispensers can have any construction not inconsistent with the objectives of the present disclosure. In some cases, for instance, a colorant and/or fragrance dispenser comprises a print head such as a piezoelectric print head or other print head described hereinabove for the fluid build material dispenser. In other embodiments, a colorant dispenser has a construction described in U.S. Pat. App. Pub. No. 2013/0034633 to von Hasseln. Thus, in some instances, a colorant and/or fragrance dispenser can permit the application of a colorant and/or fragrance to a layer of particulate material in a precise manner in the xy-plane, including in a voxel-by-voxel manner. Moreover, the fluid binder material dispenser, the colorant dispenser, and the fragrance dispenser of a system described herein, when present, can each be operated independently to selectively apply a binder material, colorant, and fragrance, respectively, to desired regions of a soap object independently. In this manner, printed soap objects having complex and precisely controlled external and internal compositions can be provided by a 3D printing system described herein.

In addition, in some embodiments, the build chamber of 3D printing systems described herein is operable to maintain a desired temperature during fabrication or printing of a 3D printed soap object. For example, in some cases, the build chamber is operable to maintain the particulate material at a temperature below the melting point of the binder material or below the melting point of one or more components of the binder material, such as one or more soap components of the binder material. In some embodiments, the particulate material is maintained at a temperature of about 45° C. or below, about 35° C. or below, or about 30° C. or below during printing. A build chamber can be operable to maintain such a temperature in any manner not inconsistent with the objectives of the present disclosure. For instance, in some cases, a build chamber can have a sufficiently large volume or thermal mass to dissipate thermal energy provided by a binder material or consolidation process described herein without a significant increase in temperature of the build chamber or build bed, where a "significant" increase in temperature can comprise an increase of more than 3° C., more than 5° C., more than 10° C., or more than 15° C. In other embodiments, a build chamber can comprise one or more temperature control devices, such as one or more cooling or heating units or surfaces. Such a temperature control device, in some cases, can be in thermal contact with the build bed of the system.

Systems described herein, in some embodiments, can also comprise a post-processing chamber comprising a particulate material removal device. The post-processing chamber can have any construction not inconsistent with the objectives of the present disclosure. In some embodiments, for instance, the particulate material removal device comprises a vacuum, a fan, or a source of pressurized gas.

Systems described herein, in some embodiments, also comprise a controller. Any controller not inconsistent with the objectives of the present disclosure may be used. Generally, a controller may comprise, include or be embodied in one or more fixed or portable electronic devices. Non-limiting examples of suitable electronic devices include a smartphone, tablet computer, laptop computer, desktop computer, workstation computer, server computer or the like. In addition, the controller may include one or more of each of a number of components such as, for example, a processor (e.g., processor unit) connected to a memory (e.g., storage device).

The processor is generally any piece of hardware that is capable of processing information such as data, computer-readable program code, instructions or the like (generally "computer programs," e.g., software, firmware, etc.), and/or other suitable electronic information. More particularly, the processor may be configured to execute computer programs, which may be stored onboard the processor or otherwise stored in the memory (of the same or another apparatus). The processor may be a number of processors, a multi-processor core, or some other type of processor, depending on the particular implementation. Further, the processor may be implemented using a number of heterogeneous processor systems in which a main processor is present with one or more secondary processors on a single chip. In one example embodiment, the processor may be a symmetric multi-processor system containing multiple processors of the same type. In another example, the processor may be embodied as or otherwise include one or more application-specific integrated circuits (ASICs), field-programmable gate arrays (FPGAs), or the like. Thus, although the processor may be capable of executing a computer program to perform one or more functions, the processor of some example embodiments may be capable of performing one or more functions without the aid of a computer program.

The memory is generally any piece of hardware that is capable of storing information such as data, computer programs and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or a combination of the foregoing. An optical disk may be a compact disk-read only memory (CD-ROM), a compact disk-read/write (CD-R/W), a DVD, or the like. In various instances, the memory may be referred to as a computer-readable storage medium which, as a non-transitory device capable of storing information, may be distinguishable from computer-readable transmission media such as electronic transitory signals capable of carrying information from one location to another. A computer-readable medium as described herein may generally refer to a computer-readable storage medium or computer-readable transmission medium.

In addition to the memory, the processor may also be connected to one or more interfaces for displaying, transmitting and/or receiving information. The interfaces may include a communications link (e.g., communications unit) and/or one or more user interfaces. The communications link may be configured to transmit and/or receive information, such as to and/or from other apparatus, network(s), or the like. The communications link may be configured to transmit and/or receive information by physical (wireline) and/or wireless communications links. Examples of suitable communication links include a network interface controller (NIC), wireless NIC (WNIC), or the like.

The user interfaces may include a display and/or one or more user input interfaces (e.g., input/output unit). The display may be configured to present or otherwise display information to a user. Non-limiting examples of displays include a liquid crystal display (LCD), light-emitting diode display (LED), and plasma display panel (PDP). The user input interfaces may be wireline or wireless, and may be configured to receive information from a user into the system, such as for processing, storage and/or display. Non-limiting examples of user input interfaces suitable for use in some example embodiments described herein include a microphone, image or video capture device, keyboard or keypad, joystick, touch-sensitive surface (separate from or integrated into a touchscreen), and biometric sensor.

As indicated above, program code instructions may be stored in memory and executed by a processor to implement functions of a system or component of a system described herein. As will be appreciated, any suitable program code instructions not inconsistent with the objectives of the present disclosure may be loaded onto a computer or other programmable controller from a computer-readable storage medium to produce a particular machine, such that the particular machine becomes a means for implementing the functions specified herein.

Further, execution of instructions by a processor, or storage of instructions in a computer-readable storage medium, supports combinations of operations for performing the specified functions. It will also be understood that one or more functions, and combinations of functions, may be implemented by special purpose hardware-based computer systems and/or processors which perform the specified functions, or combinations of special purpose hardware and program code instructions.

Further, the program code instructions, in some instances, can comprise commercially available software. In other example embodiments, the program code instructions comprise custom software. In some example embodiments, the software has an integrated software architecture. In other example embodiments, the software has a modular software architecture.

Figure 2:
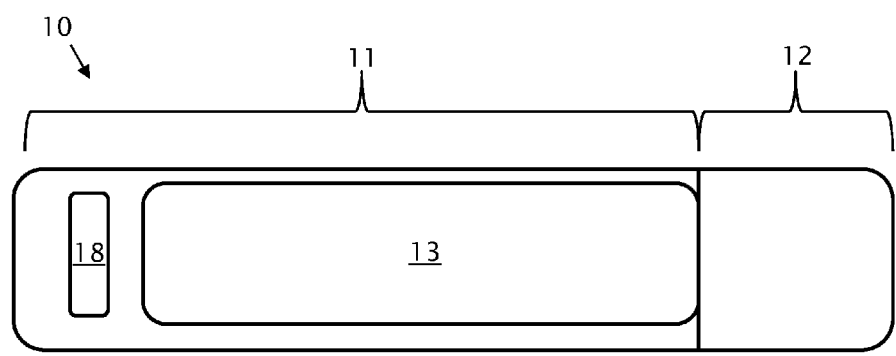
FIG. 2 illustrates a sectional view of the top of the 3D printing system of FIG. 1.

Some exemplary embodiments of 3D printing systems described herein will now be further described with reference to the drawings. FIG. 1 illustrates schematically a sectional view of the front of a 3D printing system according to one embodiment described herein. FIG. 2 illustrates a sectional view of the top of the 3D printing system of FIG. 1. As illustrated in FIGS. 1 and 2, a 3D printing system (10) comprises a build chamber (11) and a post-processing chamber (12). The build chamber (11) comprises a build bed (13), a particulate material distribution device (not shown), and a fluid binder material dispenser (14). The build chamber (11) further comprises a lid (15) covering the build chamber (11) during printing and providing access to the build chamber (11) as needed. In the embodiment of FIGS. 1 and 2, the lid (15) opens upwardly. However, other configurations are also possible. The post-processing chamber (12) comprises a particulate material removal device (not shown), a door (16), and a window (17). The door (16) provides access to a finished object printed by the system (10). Similarly, the window (17) permits a user to observe an object during post-processing. In the embodiment of FIGS. 1 and 2, the door (16) opens in a forward direction, out of the plane of the page in FIG. 1. However, other configurations are also possible. The fluid binder material dispenser (14) comprises a cartridge (18) for storing the binder material and a heated plate or other heating device (19) positioned in thermal contact with the cartridge (18). By maintaining a temperature of the cartridge (18) at or above the melting point of the binder material, the heating device (19) can ensure that the binder material disposed in the cartridge (18) reaches or remains in a fluid or liquid state for printing. The fluid binder material dispenser (14) also comprises a robotic arm (21) that can translate a print head or nozzle (28) of the fluid binder material dispenser (14) in at least two dimensions, such as in at least the x-direction and y-direction. In some cases, the robotic arm (21) can translate the print head or nozzle (28) in the z-direction also.

Figure 3:
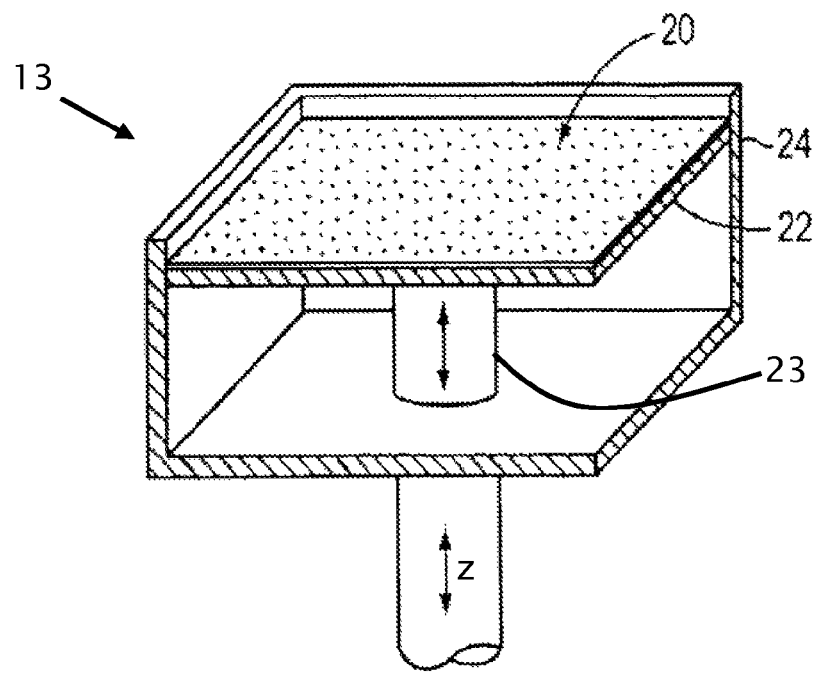
FIG. 3 illustrates a perspective view of a step of a method of printing an object using a 3D printing system according to one embodiment described herein.

FIGS. 3-6 illustrate a method of printing an object according to one embodiment described herein, including using a 3D printing system described herein. Specifically, FIG. 3 illustrates a perspective view of a build bed (13) according to one embodiment described herein. Referring to FIG. 3, a layer of a particulate material (20) is applied on a linearly movable, substantially planar surface (22) of a container (24). The layer of particulate material (20) may be formed in any suitable manner, including using a particulate material distribution device described herein, such as a counter-roller. The linear movement of the surface (22) in the z-direction can be provided by the adjustable height component (23). As illustrated in FIG. 3, the adjustable height component (23) may be a piston or cylinder. However, other constructions are also possible. The particulate material (20) applied to the surface (22) includes a soap component in an amount described hereinabove. The particulate material (20) may also include an additive described hereinabove.

Figure 4:
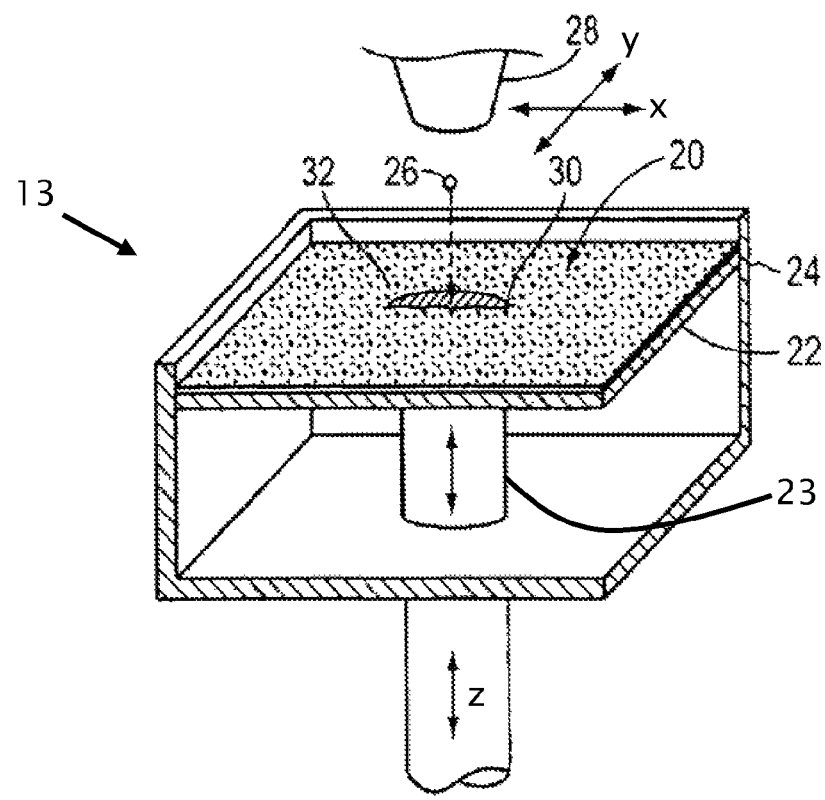
FIG. 4 illustrates a perspective view of a step of a method of printing an object using a 3D printing system according to one embodiment described herein.
Figure 5:
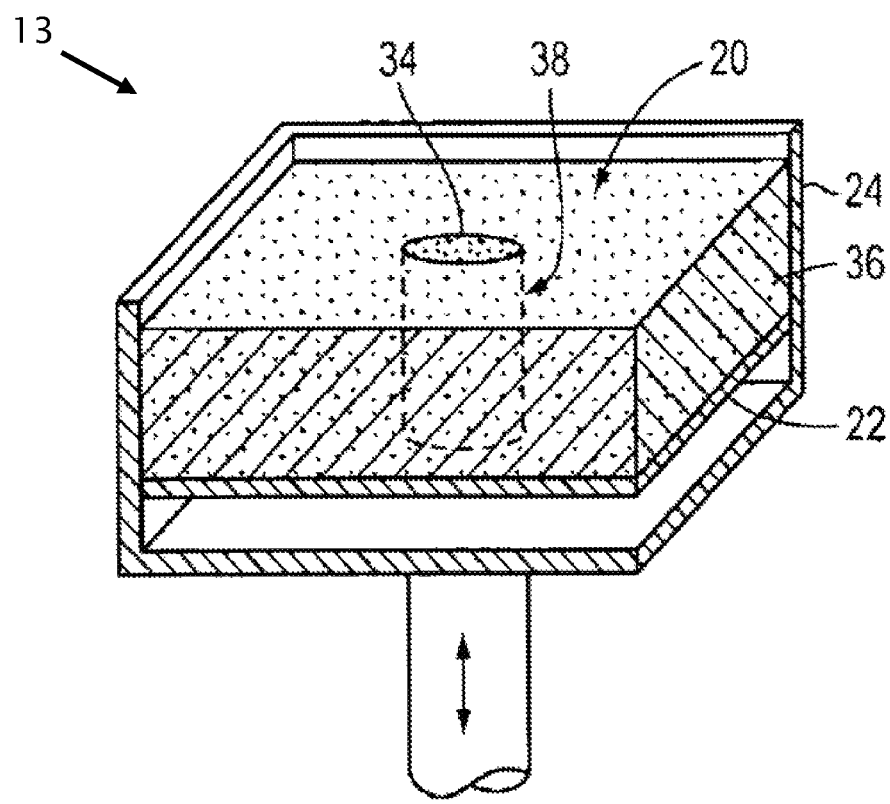
FIG. 5 illustrates a perspective view of a step of a method of printing an object using a 3D printing system according to one embodiment described herein.
Figure 6:
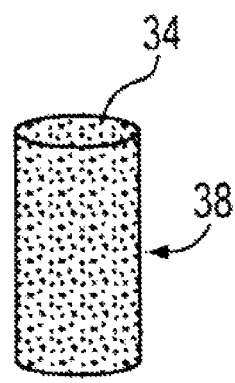
FIG. 6 illustrates a perspective view of a printed object formed according to one embodiment of a method described herein.

FIG. 4 illustrates a perspective view of a fluid binder material dispenser applying a fluid binder material to a layer of particulate material disposed on a build bed according to one embodiment described herein. Specifically, referring to FIG. 4, a piezoelectric print head or nozzle (28) delivers a drop or portion of a fluid binder material (26) to a portion (30) of the layer of particulate material (20) in a two-dimensional pattern. In some embodiments, the fluid binder material (26) includes an adhesive or a soap component, such as a melted fatty acid or fatty acid salt. The fluid binder material (26) may also include an additive described hereinabove. As described herein, the fluid binder material (26) can be delivered to the layer of particulate material (20) in any desired predetermined two-dimensional pattern. For illustration purposes, the pattern is depicted in FIGS. 4-6 as a generally circular pattern. However, other patterns are also possible. Moreover, as described herein, the pattern can vary from cross-section-to-cross-section or layer-to-layer during the printing process to provide a printed object having a complex and non-uniform shape or structure. Further, the pattern can be provided using any suitable fluid binder material dispenser mechanism, such as a drop-on-demand (DOD) print head driven by a controller in accordance with object design data in a manner described hereinabove.

Referring again to FIG. 4, a first portion (30) of the particulate material (20) consolidates in response to the fluid binder material (26). For example, the first portion (30) of the particulate material (20) can consolidate due to adhesive action provided by the fluid binder material (26). In one exemplary embodiment, the fluid binder material (26) comprises a melted fatty acid or fatty acid salt, and contact of the fluid binder material (26) with the first portion (30) of the particulate material (20) results in freezing or solidification of the fluid binder material (26), either immediately or within a desired time period following contact. In some cases, the timescale of consolidation can be selected based on one or more of the temperature of the particulate material (20), the temperature of the fluid binder material (26) when applied, the melting point of the fluid binder material (26), the viscosity of the fluid binder material (26), and the chemical compositions of the particulate material (20) and the fluid binder material (26). In any event, the consolidation of the first portion (30) of the particulate material (20) in contact with the fluid binder material (26) can form a conglomerate of a particulate material phase including a plurality of particles of the particulate material (20) and a binder material phase formed from the fluid binder material (26) dispersed throughout the particulate material phase. As illustrated in FIGS. 4-6, the conglomerate defines an essentially solid circular layer that becomes a cross-sectional portion of an object (38).

Not intending to be bound by theory, it is believed that when the fluid binder material (26) initially comes into contact with the particulate material (20), the fluid binder material (26) immediately flows outwardly (on a microscopic scale) from the point of impact by capillary action. In some embodiments, a typical droplet of fluid binder material (26) may have a volume of about 10-10,000 picoliters (pL) and may spread to a diameter of about 10-100 micrometers (μm) after coming into contact with the particulate material (20). As the fluid binder material (26) cools, it is believed that the fluid viscosity increases dramatically, arresting further migration of the fluid binder material (26) from the initial point of impact. Within a few minutes or less, the fluid binder material (26), in some cases, can completely or substantially completely solidify or otherwise provide adhesive bonds between particles of the particulate material (20). In this manner, the fluid binder material (26) can form a binder material phase dispersed throughout a particulate material phase formed by a plurality of particles of the particulate material (20), wherein the combination of the binder material phase and the particulate material phase can provide a cross-sectional portion of the object (38).

Further, as illustrated in FIGS. 4 and 5, any portion (34) of particulate material not exposed to the fluid binder material (26) remains loose and free-flowing on the movable surface (22). This loose particulate material (32) can be left in place until formation of the object (38) is complete. Leaving the dry, loose particulate material (32) in place can ensure that the object (38) is fully supported during printing, allowing features such as overhangs, undercuts, and cavities to be defined and formed without the need to use supplemental support structures. After formation of the first cross-sectional portion of the object (38), the movable surface (22) is indexed downwardly, and the foregoing process is repeated.

For example, using a counter-rolling mechanism or other particulate material distribution device, a second layer of particulate material can be applied onto or over the first layer, covering both the consolidated first cross-sectional portion, and any proximate loose particulate material. A second application of fluid binder material follows in the manner described above, providing a second consolidated cross-sectional portion similar to the first consolidated cross-sectional portion and also consolidating the first and second cross-sectional portions together, including by extending the particulate material phase and the binder material phase in the z-direction. Next, the movable surface (22) can again be indexed downwardly, and the process repeated once more.

In general, the previous steps of (1) applying a layer of particulate material, (2) applying a fluid binder material to at least a portion of the layer of particulate material in an amount sufficient to consolidate particles of the layer to define a cross-sectional portion of an object, and (3) indexing the movable surface downwardly are repeated until the object is completed. Referring to FIG. 5, the object (38) may be any shape, such as cylindrical. At the end of the printing process, only a top surface or final cross-sectional portion (34) of the object (38) is visible in the container (24). The object (38) is typically completely immersed in a surrounding bed (36) of dry and loose particulate material. Alternatively, an object could also be formed in layers upward from an immovable platform by successively depositing, smoothing, and printing a series of such layers in a manner analogous to the process described above.

Referring to FIG. 6, the dry and loose particulate material may be removed from the printed object (38) using a particulate material removal device (not shown), such as a vacuum, fan, or source of pressurized gas or air flow. After removal of the dry and loose particulate material from the object (38), additional post-processing may be performed if desired, such as drying the object or infiltrating the object with an infiltrant to provide one or more additional properties to the object.

Various embodiments of 3D printing systems have been described herein, including with reference to the drawings. It is to be understood that 3D printing systems described herein are not limited to the specific examples described herein. Instead, 3D printing systems described herein can include any combination of components not inconsistent with the objectives of the present disclosure. For example, a 3D printing system can comprise any build bed described herein in combination with any particulate material distribution device and/or any fluid binder material dispenser described herein not inconsistent with the objectives of the present disclosure. Similarly, a 3D printing system described herein can be used with any combination of a particulate material and a binder material not inconsistent with the objectives of the present disclosure, including a combination of a particulate material and a binder material described hereinbelow.

II. Kits for 3D Printing

In another aspect, kits for 3D printing are described herein. In some embodiments, a kit described herein comprises a particulate material comprising a soap component and a binder material operable to consolidate particles of the soap component when applied to the particles in a fluid state.

Turning now to specific components of kits, kits described herein comprise a particulate material comprising a soap component. Any particulate material comprising a soap component not inconsistent with the objectives of the present disclosure may be used. In some embodiments, the particulate material of a kit described herein comprises a particulate material described hereinabove in Section I. Any particulate material described hereinabove in Section I may be used. For example, in some cases, the particulate material of a kit can comprise a soap component in an amount of about 10 to 100% by weight, based on the total weight of the particulate material. In some embodiments, the particulate material comprises a soap component in an amount of about 30 to 100% by weight, about 50 to 100% by weight, about 60 to 100% by weight, about 80 to 100% by weight, about 30 to 90% by weight, about 60 to 90% by weight, about 30 to 80% by weight, or about 40 to 70% by weight, based on the total weight of the particulate material.

Moreover, in some cases, the soap component of a particulate material described herein comprises or is formed from one or more surfactants, one or more organosulfates, one or more fatty acids, and/or one or more fatty acid salts. Further, a fatty acid salt can be a sodium salt of a fatty acid or a potassium salt of a fatty acid. Non-limiting examples of soap components suitable for use in a particulate material of a kit described herein include sodium lauryl sulfate, sodium tallowate, sodium cocoate, sodium palm kernelate, sodium laurate, sodium myristate, sodium palmitate, sodium stearate, sodium oleate, sodium linoleate, sodium linolenate, and combinations of two or more of the foregoing. Further, in some embodiments, the sodium counter ions of one or more of the foregoing species can be replaced with potassium counter ions to provide potassium-containing species. The soap component can also comprise a fatty acid such as one or more of lauric acid, myristic acid, palmitic acid, stearic acid, oleic acid, linoleic acid, and linolenic acid. Further, in some instances, the soap component can comprise a mixture of surfactants, fatty acids, fatty acid salts, and/or organosulfates described herein.

In addition, the particulate material of a kit described herein can further comprise one or more additives described hereinabove in Section I, including one or more additives selected from foaming agents, colorants, fragrances, preservatives, abrasion agents, antimicrobial agents, and antifungal agents. Further, such an additive can be present in a particulate material of a kit in any amount described hereinabove in Section I for additives.

Similarly, the binder material of a kit described herein can comprise any binder material described hereinabove in Section I. For example, in some embodiments, the binder material of a kit comprises an adhesive material or a soap component in an amount of about 10 to 100% by weight, based on the total weight of the binder material. Moreover, when a binder material described herein comprises or is formed from a soap component, the soap component of the binder material can be chemically the same or chemically different than the soap component of the particulate material of the kit. Further, it is to be understood that the binder material of a kit described herein may be a solid or a liquid when provided as a component of a kit. The binder material of a kit described herein can also comprise one or more additives of a fluid binder material described hereinabove in Section I, including in an amount described hereinabove in Section I.

In addition, a particulate material and a binder material can be provided in a kit described herein in any relative amounts not inconsistent with the objectives of the present disclosure. In some cases, for instance, the weight ratio of the particulate material to the binder material of a kit described herein is between about 10:1 and about 1:10, between about 5:1 and about 1:5, between about 3:1 and 1:3, or between about 2:1 and about 1:2.

Moreover, a kit described herein can comprise any combination of a particulate material described herein with a binder material described herein not inconsistent with the objectives of the present disclosure. For example, in some embodiments, the particulate material of a kit described herein comprises a soap component in an amount of about 10 to 100% by weight, based on the total weight of the particulate material, and the binder material of the kit comprises a soap component in an amount of about 10 to 100% by weight, based on the total weight of the binder material, or a mixture or blend of aqueous sodium hydroxide (NaOH) or aqueous potassium hydroxide (KOH) with an oil, the mixture or blend being present in the binder material in an amount of about 10 to 100% by weight, based on the total weight of the binder material.

III. Methods of Printing a 3D Soap Object

In another aspect, methods of printing a 3D soap object are described herein. In some embodiments, a method of printing a 3D object described herein comprises providing a layer of particulate material including a plurality of adjacent particles, the particulate material comprising a soap component in an amount of about 10 to 100% by weight; and applying a fluid binder material to at least some of the plurality of particles in an amount sufficient to consolidate the particles together to define a cross-sectional portion of the object. In addition, in some cases, a method described herein further comprises repeating the foregoing steps a sufficient number of times to form the object. Thus, in some embodiments, a method described herein further comprises providing one or more additional layers of particulate material comprising a soap component; and applying a fluid binder material to at least a portion of each additional layer in an amount sufficient to consolidate particles of the one or more additional layers together to define one or more additional cross-sectional portions of the object. Moreover, such a method can be carried out in a layer-by-layer manner to provide the printed object. Further, in some embodiments, a method described herein also comprises removing excess particulate material from a surface of the printed object, including after the final amount of fluid binder material has been applied to the particulate material of the object.

Turning now to steps of methods, methods of printing a 3D soap object described herein comprise providing a layer of particulate material including a plurality of adjacent particles, the particulate material comprising a soap component in an amount of about 10 to 100% by weight, based on the total weight of the particulate material. The layer of particulate material can be provided in any manner not inconsistent with the objectives of the present disclosure. In some embodiments, for instance, the layer of particulate material is a planar or substantially planar layer provided by a particulate material distribution device described hereinabove, such as a planarizer or counter-roller. Similarly, the particles of the particulate material can be formed of any material described hereinabove in Sections I and II for a particulate material. For example, in some cases, the soap component of the layer of particulate material of a method described herein comprises or is formed from particles of one or more surfactants, one or more organosulfates, one or more fatty acids, and/or one or more fatty acid salts. Further, a fatty acid salt can be a sodium salt of a fatty acid or a potassium salt of a fatty acid. Additionally, in some instances, the particulate material of a method described herein further comprises one or more additives, such as one or more foaming agents, colorants, fragrances, preservatives, abrasion agents, antimicrobial agents, and antifungal agents. Moreover, the particulate material can comprise a soap component and one or more additives in any amount described hereinabove in Sections I and II. For instance, in some embodiments, the particulate material comprises a soap component in an amount of about 30 to 100% by weight, about 50 to 100% by weight, about 60 to 100% by weight, about 80 to 100% by weight, about 30 to 90% by weight, about 60 to 90% by weight, about 30 to 80% by weight, or about 40 to 70% by weight, based on the total weight of the particulate material.

Methods of printing a 3D object described herein also comprise applying a fluid binder material to at least some of the plurality of particles of the particulate material in an amount sufficient to consolidate the particles together to define a cross-sectional portion of the object. A fluid binder material can be applied to such particles in any manner not inconsistent with the objectives of the present disclosure, including in a manner described hereinabove. In some embodiments, for instance, the fluid binder material is applied using a fluid binder material dispenser described hereinabove in Section I, such as a dispenser comprising a piezoelectric print head. Similarly, the fluid binder material can comprise any binder material described herein in a fluid state. In some cases, for example, the fluid binder material comprises or is formed from a melted fatty acid and/or fatty acid salt.

Moreover, the fluid binder can be applied at any temperature and/or viscosity not inconsistent with the objectives of the present disclosure. In some cases, the fluid binder material is applied when at a temperature greater than about 40° C., greater than about 45° C., greater than about 50° C., greater than about 60° C., greater than about 70° C., greater than about 80° C., or greater than about 90° C. In some embodiments, the fluid binder material is applied at a temperature between about 40° C. and about 95° C., between about 45° C. and about 90° C., between about 50° C. and about 90° C., between about 60° C. and about 90° C., between about 60° C. and about 80° C., or between about 70° C. and about 90° C. Further, in some instances, the fluid binder is applied at a viscosity ranging from about 5 centipoise (cP) to about 25 cP, from about 8 cP to about 14 cP, or from about 10 cP to about 20 cP at a temperature of about 80° C. when measured according to ASTM standard D2983 (e.g., using a Brookfield Model DV-II+ Viscometer). In some embodiments, a fluid binder material has a viscosity ranging from about 9.5 cP to about 12.5 cP or from about 14 cP to about 20 cP at a temperature of about 80° C. A fluid binder material, in some embodiments, has a viscosity ranging from about 10.5 cP to about 12.5 cP at a temperature of about 80° C. In some cases, a fluid binder material has a viscosity ranging from about 5 cP to about 7 cP or from about 8 cP to about 10 cP at a temperature of about 85-87° C.

In addition, in some embodiments, the fluid binder material is applied to the particulate material when the particulate material is at a lower temperature than the fluid binder material. For example, in some cases, the particulate material is at a temperature below the melting point of the binder material or below the melting point of one or more components of the binder material, such as one or more soap components of the binder material. In some embodiments, the particulate material is maintained at a temperature of about 45° C. or below, about 35° C. or below, or about 30° C. or below during printing.

Methods of printing a 3D object described herein, in some embodiments, further comprise removing excess particulate material from a surface of the printed object. "Excess" particulate material, for reference purposes herein, refers to particulate material that is not consolidated with a binder material to form a cross-sectional portion of the object in a manner described herein but is instead loose particulate material disposed on or attached to a surface of the printed object. Excess particulate material can be removed from a surface of a printed object in any manner not inconsistent with the objectives of the present disclosure, including using a particulate material removal device described hereinabove in Section I. In some cases, for instance, excess particulate material is removed by applying a vacuum to the surface of the printed object. In other instances, excess particulate material is removed by directing a gas stream such as a pressurized gas stream onto the surface of the printed object. The gas stream can comprise or consist essentially of an inert gas such as nitrogen or a gas such as air. In some embodiments, the gas stream is dry or substantially dry, wherein a "substantially" dry gas stream comprises less than about 1000 ppm $H_2O$, less than about 500 ppm $H_2O$, less than about 100 ppm $H_2O$, or less than about 50 ppm $H_2O$.

It is to be understood that methods of printing a 3D soap object described herein can comprise any combination of steps described herein not inconsistent with the objectives of the present disclosure. For example, in some cases, a method comprises (a) providing a layer of particulate material including a plurality of adjacent particles, the particulate material comprising a soap component in an amount of about 10 to 100% by weight, wherein the soap component comprises or is formed from one or more fatty acids and/or one or more fatty acid salts, including sodium salts and/or potassium salts; (b) applying a fluid binder material to at least some of the plurality of particles in an amount sufficient to consolidate the particles together to define a cross-sectional portion of the object, wherein the fluid binder material comprises a soap component in an amount of 10 to 100% by weight, the soap component of the binder material comprising one or more melted fatty acids or fatty acid salts, including sodium salts and/or potassium salts; (c) providing one or more additional layers of the particulate material comprising a soap component; (d) applying a fluid binder material to at least a portion of each additional layer in an amount sufficient to consolidate particles of the one or more additional layers together to define one or more additional cross-sectional portions of the object; (e) repeating steps (c) and (d) a sufficient number of times to form the printed object; and (f) removing excess particulate material from a surface of the printed object, wherein (g) the particulate material is maintained at a temperature of about 35° C. or below during printing and (h) the fluid binder material, when applied to the particulate material, has a temperature of greater than about 50° C. Other combinations of steps are also possible.

IV. Soap Objects Made by Additive Manufacturing

In another aspect, printed 3D soap objects, parts, or articles are described herein. For reference purposes herein and consistent with the foregoing disclosure, the terms "printed 3D soap objects" and "soap objects made by additive manufacturing" are to be understood as synonymous terms. Such objects described herein, in some cases, can exhibit one or more desirable properties compared to some other soap objects.

In some embodiments, a printed 3D soap object described herein comprises a particulate material phase including a plurality of particles; and a binder material phase dispersed throughout the particulate material phase and chemically or physically differing from the particulate material phase, wherein the particulate material phase comprises a soap component in an amount of about 10 to 100% by weight, based on the total weight of the particulate material phase. Moreover, in some cases, the binder material phase comprises an adhesive material or a soap component in an amount of about 10 to 100% by weight, based on the total weight of the binder material phase. Other amounts of a soap component or adhesive material may also be used in a particulate material phase or binder material phase described herein. In some embodiments, for instance, the particulate material phase comprises a soap component in an amount described hereinabove in Sections I and II for a soap component of a particulate material. Similarly, in some cases, the binder material phase comprises an adhesive material or a soap component in an amount described hereinabove in Sections I and II for an adhesive material or soap component of a binder material.

Further, the soap component of a particulate material phase and/or the soap component of a binder material phase can comprise or be formed from any material described hereinabove in Sections I and II for a soap component. For example, in some instances, the soap component of a particulate material phase and/or a binder material phase comprises one or more surfactants, one or more organosulfates, one or more fatty acids, and/or one or more fatty acid salts, including sodium salts and/or potassium salts. Thus, in some embodiments, the particulate material phase and/or the binder material phase of a soap object described herein comprises one or more fatty acids or fatty acid salts, including sodium salts of a fatty acid and/or potassium salts of a fatty acid. Further, in some cases, the soap component of a particulate material phase differs chemically or compositionally from the soap component of the binder material phase. More generally, a particulate material phase that chemically or physically differs from a binder material phase can have a different chemical composition and/or one or more different physical characteristics, such as density or porosity, sufficient to spatially distinguish the two phases in the printed soap object.

Moreover, the binder material phase of an object described herein can form a network within the object, including a continuous network, such that the binder material phase is a continuous network phase. Similarly, in some embodiments, the particulate material phase of an object described herein can be an interconnected granular phase in which all or substantially all of the particles of the particulate material are in contact with one another, as opposed to being completely separated by the binder material phase. For example, in some cases, at least about 90%, at least about 95%, or at least about 99% of the particles of the particulate material are in direct contact with at least one other particle of the particulate material phase.

Additionally, the binder material phase and the particulate material phase of an object described herein can be present in the object in any amount not inconsistent with the objectives of the present disclosure. In some embodiments, for instance, the binder material phase is present in the object in an amount of about 1 to 99% by weight, based on the total weight of the object. In some cases, the binder material phase is present in the object in an amount of about 10 to 90% by weight, about 20 to 80% by weight, about 30 to 70% by weight, or about 40 to 60% by weight, based on the total weight of the object. Similarly, in some instances, the particulate material phase is present in the object in an amount of about 1 to 99% by weight, based on the total weight of the object. In some cases, the particulate material phase is present in the object in an amount of about 10 to 90% by weight, about 20 to 80% by weight, about 30 to 70% by weight, or about 40 to 60% by weight, based on the total weight of the object.

Further, in some embodiments, the particulate material phase and/or the binder material phase of a printed 3D soap object described herein can itself have a heterogeneous composition. For example, in some instances, a soap object described herein (or the particulate material phase and/or binder material phase of a soap object described herein) can comprise a plurality of regions having differing colors and/or fragrances. Such a structure, in some cases, can be provided by the selective deposition of a colorant and/or fragrance to a cross-sectional portion of an object in a manner described hereinabove in Section I. Thus, in some embodiments, a soap object described herein can comprise a first region (such as a first voxel) having a first color and/or a first fragrance, and a second region (such as a second voxel) having a second color and/or a second fragrance, wherein the first color differs from the second color and the first fragrance differs from the second fragrance. Similarly, in some cases, a soap object described herein can further comprise a third region (such as a third voxel) and a fourth region (such as a fourth voxel) having, respectively, a third color and/or a third fragrance and a fourth color and/or a fourth fragrance, wherein the third and fourth colors and fragrances can be the same or different from each other and/or from the first and second colors and fragrances. Moreover, it is to be understood that, in some embodiments, a soap object described herein can in the same manner have up to 100, up to 1000, up to 10,000, or more than 10,000 such regions (or voxels) having independently selected colors and/or fragrances.

Additionally, a printed 3D soap object described herein, in some instances, can also have a high feature resolution, including in combination with one or more other properties of soap objects described hereinabove. The "feature resolution" of an object, for reference purposes herein, can be the smallest controllable physical feature size of the object. For example, the feature resolution can correspond to the printing resolution of the additive manufacturing method used to make the object. The feature resolution of an object can be described in terms of a unit of distance such as microns ($\mu$m), or in terms of dots per inch (dpi). As understood by one of ordinary skill in the art, a higher feature resolution corresponds to a higher dpi value but a lower distance value in $\mu$m. In some cases, a soap object described herein has a feature resolution of about 500 $\mu$m or less, about 200 $\mu$m or less, about 100 $\mu$m or less, or about 50 $\mu$m or less. In some embodiments, an object has a feature resolution between about 50 $\mu$m and about 500 $\mu$m, between about 50 $\mu$m and about 200 $\mu$m, between about 50 $\mu$m and about 100 $\mu$m, or between about 100 $\mu$m and about 200 $\mu$m. Correspondingly, in some instances, an object described herein has a feature resolution of at least about 100 dpi, at least about 200 dpi, at least about 250 dpi, at least about 400 dpi, or at least about 500 dpi. In some cases, the feature resolution of an object is between about 100 dpi and about 600 dpi, between about 100 dpi and about 250 dpi, or between about 200 dpi and about 600 dpi.

Various embodiments of the disclosure have been described in fulfillment of the various objectives of the disclosure. It should be recognized that these embodiments are merely illustrative of the principles of the present disclosure. Numerous modifications and adaptations thereof will be readily apparent to those skilled in the art without departing from the spirit and scope of the disclosure.

That which is claimed:

1. A method for fabricating a three-dimensional soap object from a particulate material and a fluid binder material based on design data, method comprising:
   a) distributing a layer of the particulate material of in a build chamber using particulate material distribution device; and
   b) selectively applying the fluid binder material, using a fluid binder material dispenser, to a portion of the layer of particulate material in an amount sufficient to consolidate the portion to define a cross-sectional portion of the soap object, in accordance with the design data; and
   c) repeating steps a) and b) until the three-dimensional soap object is completed
   wherein the particulate material comprises a soap component in an amount of 40 to 100% by weight.

2. The method of claim 1, wherein the particulate material or the fluid binder material further comprises one or more colorants and/or one or more fragrances.

3. The method of claim 1 further comprising removing excess particulate material from a surface of the printed object after a final amount of the fluid binder material has been applied to the particulate material of the object.

4. The method of claim 3, wherein the excess particulate material is removed by a vacuum, a fan, or a source of pressurized gas.

5. The method of claim 1, wherein the fluid binder material is applied to the particulate material when the particulate material is at a temperature below a melting point of one or more components of the binder material.

6. The method of claim 1, wherein the soap component comprises one or more surfactants.

7. The method of claim 1, wherein the soap component comprises one or more fatty acids or fatty acid salts.

8. The method of claim 7, wherein the soap component comprises one or more sodium salts of a fatty acid.

9. The method of claim 7, wherein the soap component comprises one or more potassium salts of a fatty acid.

10. The method of claim 1, wherein the soap component comprises one or more organosulfates.

11. The method of claim 1, wherein the soap component comprises one or more of sodium lauryl sulfate, sodium tallowate, sodium cocoate, sodium palm kernelate, sodium laurate, sodium myristate, sodium palmitate, sodium stearate, sodium oleate, sodium linoleate, and sodium linolenate.

12. The method of claim 1, wherein the particulate material further comprises one or more additives selected from foaming agents, colorants, fragrances, preservatives, abrasion agents, antimicrobial agents, and antifungal agents.

13. The method of claim 1, wherein the particulate material further comprises one or more of sodium carbonate, sodium bicarbonate, sodium chloride, citric acid, ethylenediaminetetraacetic acid or a salt thereof, sodium metasilicate, kaolin, clay, sand, pumice, and titanium dioxide.

14. The method of claim 1, wherein the particulate material further comprises metal particles.

15. The method of claim 1, wherein the binder material comprises an adhesive material in an amount of 10 to 100% by weight.

16. The method of claim 1, wherein the binder material comprises a soap component in an amount of 10 to 100% by weight.

17. The method of claim 16, wherein the soap component of the binder material comprises one or more fatty acids or fatty acid salts.

18. The method of claim 1, wherein the binder material comprises one or more of cocoa butter, shea butter, coconut acid, palm kernel acid, and glycerin.

19. The method of claim 1, wherein the binder material further comprises one or more additives selected from colorants, fragrances, preservatives, antimicrobial agents, and antifungal agents.

20. The method of claim 1, wherein the particulate material is maintained at a temperature of 35° C. or below during fabrication of the object.

* * * * *